Sept. 21, 1937.    G. L. KELLEY ET AL    2,093,608
VEHICLE BODY
Filed Jan. 4, 1934    3 Sheets-Sheet 3
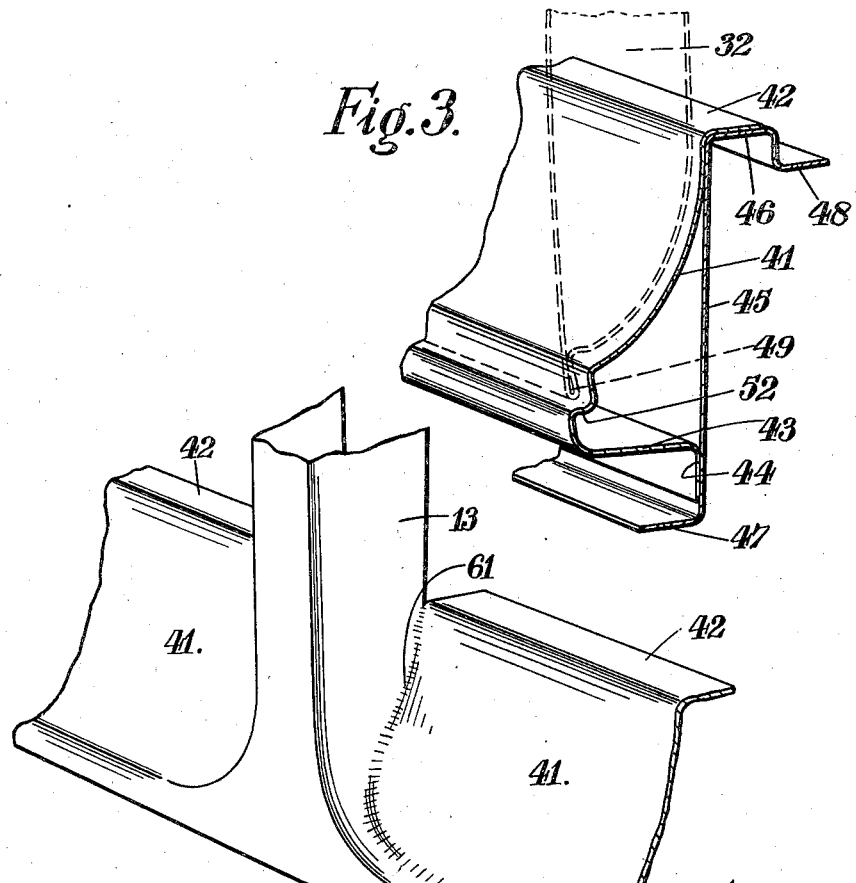
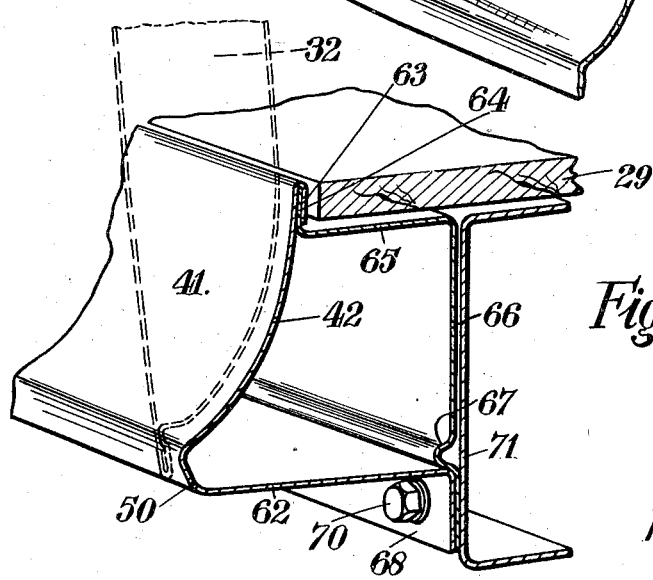
Inventors.
George L. Kelley.
Robert Robertson.
per John P. Simon
Attorney.

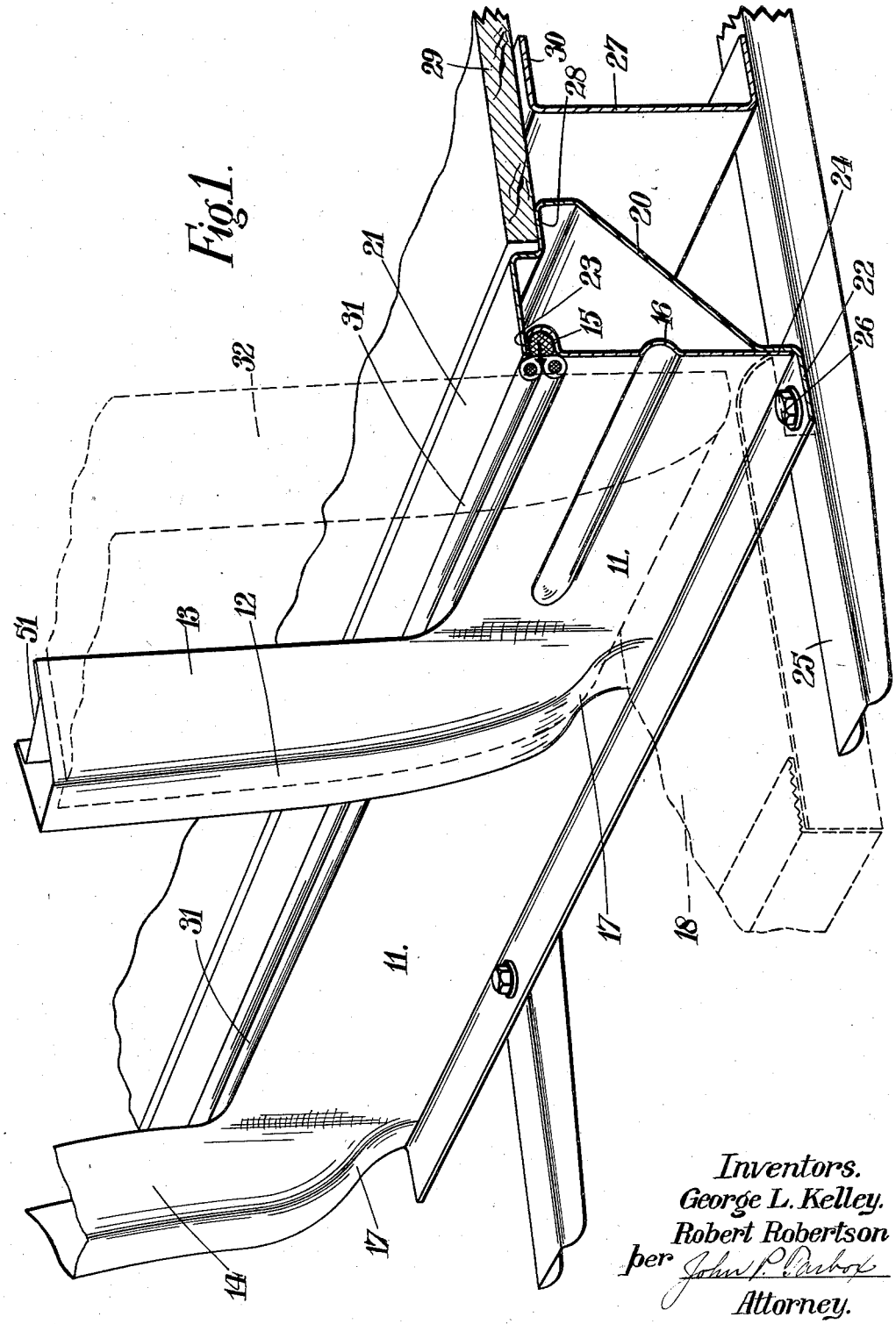

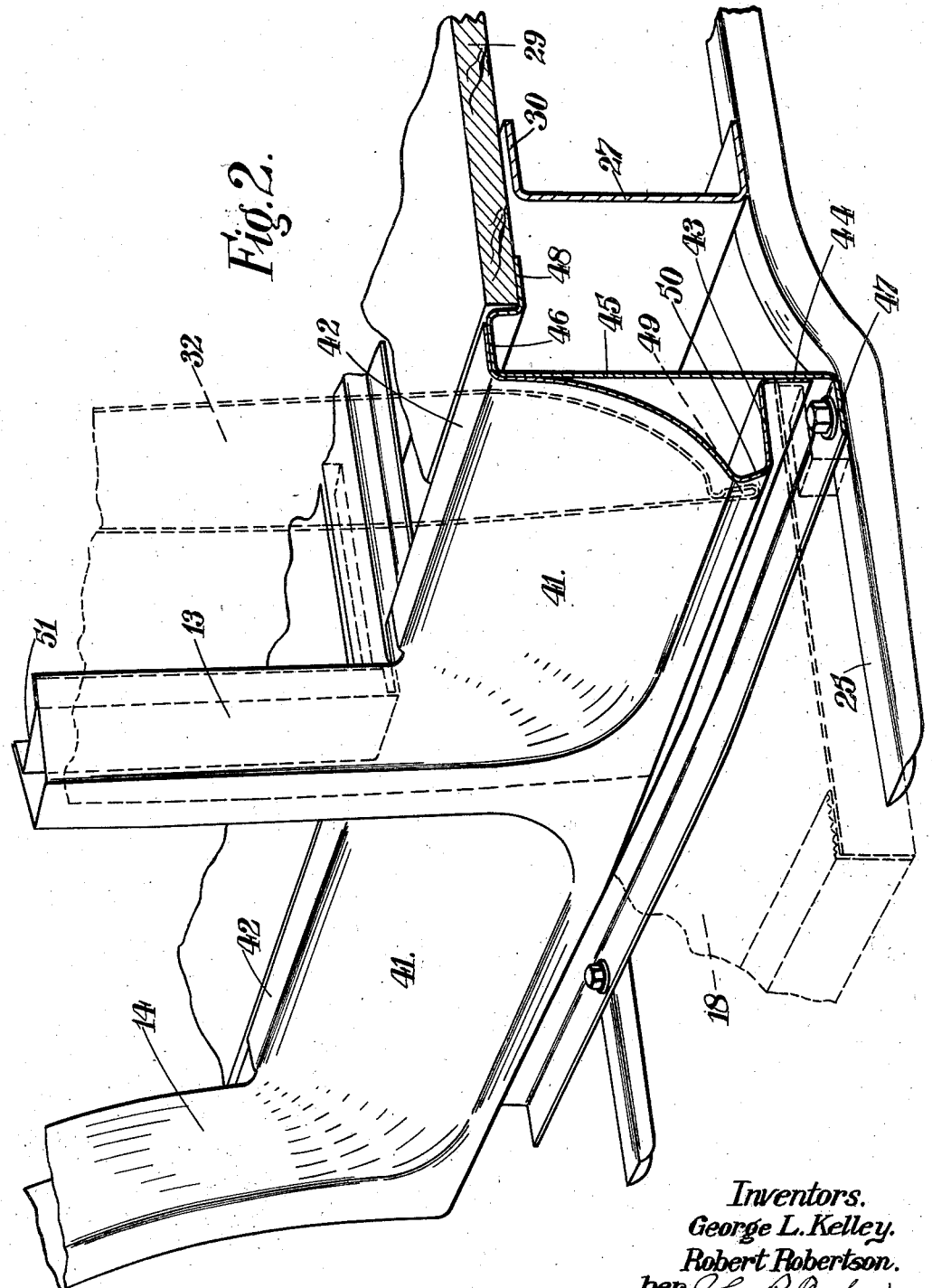

Patented Sept. 21, 1937

2,093,608

UNITED STATES PATENT OFFICE 2,093,608

VEHICLE BODY

George Leslie Kelley and Robert Robertson, Oxford, England, assignors to The Pressed Steel Company of Great Britain Limited, Oxford, England, a British company Application January 4, 1934, Serial No. 705,218
In Great Britain February 17, 1933

8 Claims. (Cl. 296—28)

It has been the practice to build vehicle bodies of sheet metal comprised of stampings, e. g. a one piece side stamping extending from the front or "A" post to the rear of the body, a front portion or cowl structure and a tonneau panel all joined together by welding to present a one piece structure. The side panels are reinforced by inner stampings, the lower portions of the side wall structure being formed substantially as a box section for securement to the chassis frame side sills. Each side wall structure is, of course, formed with the usual door and window openings, whilst it has been customary to form the threshold portions of the door openings to lie substantially in the plane of the outer contour of the body as defined by the post structures.

The object of the present invention is to provide an improved structure of this type which resembles, to a certain degree, a composite body structure but without losing the advantages of the all-steel construction, and without rendering its production more difficult or costly. A further object of the invention is to provide more running-board space for the occupant when the doors are open and to ensure that the doors fit more accurately thereby creating a more weatherproof structure.

The construction lends itself very readily to the adoption of doors formed with square or rounded corners and further enables such doors to be produced more cheaply.

The aim in the design of modern vehicle bodies is to provide strength with lightness and low centre of gravity to give better stability and riding qualities which may be obtained by means of this invention.

According to the present invention the side wall structure of a sheet metal vehicle body is formed in its lower margins with threshold portions of substantially box section lying out of the plane of the outside contour of the body, the outer panel of said structure being secured as by e. g. welding or clinching to a longitudinal sill member.

Preferably said sill member is of Z-section although it may also be of angle or channel section adapted to be secured to the chassis frame.

The invention is illustrated in the accompanying drawings of which,

Figure 1 is a part sectional perspective view of one form of the invention,

Figure 2 is a part sectional perspective view of a modification,

Figure 3 shows a modification of Figure 2,

Figure 4 is a part perspective view of a further modification of Figure 2, and

Figure 5 is yet a further modification of Figure 2.

Referring to Figure 1 the outer panel of the side wall structure is formed with threshold portions 11 normally lying out of the plane of the outer contour of the body as defined by the outer wall 12 of the inwardly presenting channel section post member 13. Each threshold portion 11 is formed with a depression 15 extending along its upper edge, and may, if desired, be formed with a reinforcing rib 16. The B and C post 13 and the D post 14 are so formed as to merge into the threshold portions 11 and are further inset at 17 to accommodate the running-board indicated at 18. The side panel is secured along its lower edge to a channel section sill member 20 formed with horizontal flanges 21 and 22, the flange 21 overlapping and being welded to the horizontal edge 23 of the depression 15 formed in the threshold portions 11. A vertically depending portion 24 of the sill member 20 is secured, as by spot-welding, to the lower margin of the outer panel, said portion 24 being formed with the horizontal flange 22 for securement by bolting, as at 26, to the running-board support 25 extending transversely of the chassis and being secured to the chassis frame side sill 27. The sill member 20 is further formed with a ledge 28 adapted to carry floor-boards 29, which may also rest on the upper horizontal flange 30 of the chassis side sill 27. The depression 15 in the portions 11 of the outer panel may carry weather-strips 31 against which the door indicated at 32 will abut when closed. It will be clear that the depressed threshold portions 11 provide greater running-board space than heretofore, whilst the doors indicated at 32 will fit snugly at their lower ends within said depressed portions to make the body more weatherproof.

In the modification shown in Figure 2 the threshold portions 41 of the outer panel are depressed and flow smoothly from the outer contour of the body, being formed in sweeping lines to facilitate their production by stamping or pressing. Each threshold portion 41 is formed at its upper edge with a horizontal flange 42, and at its lower edge with an angular extension 43, 44. The flange 44 is secured, by e. g. spot-welding, to a Z-section body sill member 45. The flange 42 nests with the upper flange 46 of the sill member 45 and is secured thereto by spot-welding, whilst the lower flange 47 of the sill member 45 is bolted to the transverse running-board support 25 carried on the chassis frame side sill 27 in the same manner as before. The upper flange 46 of the sill member 45 is formed with a rectangular depression 48 arranged to carry the floor-boards 29, also resting on the upper flange 30 of the chassis frame side sill 27. In this case the running-board 18 is arranged to lie within the channel presented by the lower horizontal flange 43 of the threshold portions 41, the flange 44 and the flange 47 of the side sill 45. The lower flange 49 of the door, indicated at 32, overlaps the substantially vertical edge portion 50 of the threshold portions 41.

In each case the B C post 13 is reinforced by a channel section plate 51 secured therein to present a box section structure and flanged at its lower edge to nest with, and to be secured to, the horizontal flange 46 of the side sill 45, a similar construction being adopted at the other post sections.

In Figure 3 the threshold portions 41, sweeping outwardly to the outer contour of the body, are formed with a reveal as at 52 to seat the lower flange 49 of the door indicated at 32.

In Figure 4 is shown a modification of the formation of the threshold portions 41 wherein is indicated a corner as at 61.

In Figure 5 portions 41 of the threshold are formed with lower horizontal extensions 62, the upper edges being clinched over, as at 63, the upwardly extending flange 64 of the horizontal portion 65 of the side sill 66 formed with a strengthening rib 67, the flange 62 being turned downwardly as at 68 to nest with the vertical portion 66 of the side sill, and to be secured directly by the bolts 70 to the bottom of the inwardly presenting chassis frame side sill 71.

From the foregoing it will be clear that there is provided an improved sheet steel construction for automobile bodies which has the advantages of greater running-board space for the occupant of the car when the door is open and also better draft excluding properties of the doors.

It is to be observed that the formation of the threshold portions in this manner makes the production of the door stampings a simpler procedure than heretofore, in that the portions of the inner door stamping normally flanged at right angles to the main stamping to constitute the jamb portions of the door are eliminated when used in the construction shown in Figure 1 or are formed as gradually sweeping curves when used in the construction shown in Figures 2 to 5, whilst the outer door panel may be of normal form when used with the construction shown in Figures 2 to 5 and may be swept inwardly in a gradual curve when used with the construction shown in Figure 1.

Furthermore, it will be clear, particularly with reference to Figure 5, that the upper edge of the body side sill in the threshold portions lies normally in the plane of the upper edge of the chassis side sill, thereby enabling a low centre of gravity to be attained.

What we claim as our invention is:

1. A pressed metal vehicle body construction comprising a unitary stamping containing a door opening and including the threshold of the door, the stamping affording exterior walls including a door post portion giving contour to the body and an outer generally upwardly extending threshold wall lying inwardly of the outer contouring walls of the stamping, including the post portion and extending substantially to the bottom margin of the body, whereby the stamping is adapted to receive the lower edge of a door with its outer wall conforming to the outer contouring walls and its inner wall flanking the said inwardly lying upwardly extending wall of the threshold.

2. A pressed metal vehicle body according to claim 1 in which the door opening is inwardly flanged to constitute door posts, the upwardly extending threshold wall at its upper edge at least lies inwardly substantially the full depth of the said post flanges at the sides of the door opening, and the said upper edge of the threshold is inturned to project inwardly beyond the depth of said doorway flanges.

3. A pressed metal vehicle body construction according to claim 1 in which the upper edge of said upwardly extending threshold wall is integrally formed with an inwardly extending outwardly facing groove adjacent its upper margin adapted to mount a weatherseal against which the flanking face of the door may be seated.

4. A pressed metal vehicle body according to claim 1 in which the said upwardly extending threshold wall is inclined downwardly and outwardly from its upper edge substantially to the bottom margin of the body where it joins the outer contouring wall portion of the stamping.

5. A pressed metal vehicle body construction comprising a unitary stamping containing a door opening and including the threshold of the door, the stamping affording exterior walls giving contour to the body and an outer generally upwardly extending threshold wall lying inwardly of the outer contouring walls of the stamping, the upper edge of said upwardly extending threshold wall being provided with an outwardly presenting groove adapted to mount a weather-seal, together with an inner stamping horizontally connected with the upper wall of the groove and connected with the lower portion of said threshold wall with its main body removed therefrom inwardly to form a box section sill structure.

6. A pressed metal vehicle body construction comprising a unitary stamping containing a door opening and including the threshold of the door, the stamping affording exterior walls giving contour to the body, and an outer generally upwardly extending threshold wall lying inwardly of the outer contouring walls of the stamping, the threshold portion of the stamping being provided with an outturned flange at its bottom portion adapting it to be secured to a chassis, the upwardly extending threshold wall being provided with an outwardly presenting groove at its upper edge adapted to mount a weather-seal, and a threshold top and inner side member connected with said wall through the upper wall of said groove and through the lower portion of said wall but spaced therefrom in its main body whereby to form a box section structure.

7. A pressed metal vehicle body construction comprising a side sill structure including an outer stamping contouring the body and formed with a post portion defining a side of a door opening, which stamping includes the threshold of the door opening having an outer generally upwardly extending wall extending substantially to the bottom margin of the body, which wall is formed to lie inwardly of the outer contour of the body including the post portion and is arranged to receive the lower edge of a door extending substantially to the bottom margin of the body.

8. A pressed metal vehicle body construction comprising a frame providing a door opening including an outer panel stamping forming vertical and horizontal portions of said frame and constituting walls of hollow cross sectional structure, said stamping terminating in the margin of the door opening in an outwardly facing channel, the inner wall of which channel projects into the said hollow cross sectional structure, said channel being constructed and arranged to receive for securement therein a weather seal against which the flanking face of the door may be seated.

GEO. L. KELLEY.
R. ROBERTSON.